("12") United States Patent  (10) Patent No.: US 7,461,453 B1
Weerth                         (45) Date of Patent:      Dec. 9, 2008

(54) METHOD FOR ADDING A BLAST RESISTANT CARGO HOLD LINER

(75) Inventor: D. Erich Weerth, San Jose, CA (US)

(73) Assignee: Friedman Research Corporation, Santa Barbara, CA (US)

( * ) Notice: Subject to any disclaimer, the term of this patent is extended or adjusted under 35 U.S.C. 154(b) by 302 days.

(21) Appl. No.: 11/505,155

(22) Filed: Aug. 15, 2006

Related U.S. Application Data

(63) Continuation of application No. 10/979,580, filed on Nov. 1, 2004, now abandoned.

(51) Int. Cl.
 *B21D 47/00* (2006.01)
(52) U.S. Cl. ............... 29/897.1; 29/397.32; 29/525.01; 29/525.02; 220/560.01; 220/560.02; 220/592; 220/651; 428/105; 428/911
(58) Field of Classification Search ............ 29/523, 29/525.01, 525.02, 525.11, 897.1, 897.32; 220/560.01, 560.02, 589, 592, 62.19, 651, 220/652, 653, 900; 428/111, 105, 109, 110, 428/911; 244/118.1, 118.2, 121
See application file for complete search history.

(56) References Cited

U.S. PATENT DOCUMENTS

| 2,362,951 | A | * | 11/1944 | Wallis ................... 522/249 |
| 3,167,209 | A | * | 1/1965 | Jones ..................... 383/22 |
| 4,428,491 | A | * | 1/1984 | Mittelmann et al. ........ 220/1.5 |
| 5,360,129 | A | * | 11/1994 | Lee ...................... 220/1.5 |
| 5,769,257 | A | * | 6/1998 | Fleisher et al. ............ 220/1.5 |
| 6,092,272 | A | * | 7/2000 | Durham et al. .......... 294/421.1 |
| 6,341,708 | B1 | * | 1/2002 | Palley et al. ............. 220/1.5 |
| 6,629,597 | B2 | * | 10/2003 | Barker ..................... 206/3 |
| 6,991,124 | B1 | * | 1/2006 | Palley et al. ............. 220/1.5 |
| 2005/0188825 | A1 | * | 9/2005 | Sharpe et al. ............ 86/50 |

\* cited by examiner

*Primary Examiner*—Jermie E Cozart
(74) *Attorney, Agent, or Firm*—Mark Rodgers

(57) ABSTRACT

The invention is an explosive resistant liner, located inside an enclosed space, and made from a blast resistant material. The liner is preferably constructed inside the enclosed space, consisting of lay-up, curing and assembly steps utilizing a collapsible tool. The invention is particularly applicable to blast protection for aircraft cargo holds.

9 Claims, 5 Drawing Sheets

Blast Resistant Liner for Use in Limited Access Enclosures

METHOD FOR ADDING A BLAST RESISTANT CARGO HOLD LINER

RELATED APPLICATIONS

This application is a continuation of U.S. application Ser. No. 10/979,580, filed Nov. 11, 2004 now abandoned.

FEDERALLY SPONSORED RESEARCH

Not Applicable

SEQUENCE LISTING

Not Applicable

BACKGROUND OF THE INVENTION

This invention relates to explosion resistant interior space liners capable of mitigating the shock, overpressure, fragmentation and fire effects of an explosion within the interior space without catastrophic structural or critical systems failure to the building, aircraft or vehicle where the liner is installed. The invention particularly relates to aircraft, specifically installation and operation within cargo holds of commercial air transport category aircraft.

Aircraft are considered to be a likely target for terrorists, based on historical events such as the Pan Am Lockerbie incident, 9/11, and other unexplained in-flight disasters that may have been due to terrorist activity. Therefore, it is a major goal of the US Federal Aviation Administration (FAA) and the US Transportation Safety Authority (TSA) to improve the resistance of aircraft to improvised explosive devices (IED's), particularly explosives placed in checked luggage or cargo, as items placed in the cargo hold are harder to screen than carry-on items.

Wide body aircraft store cargo in containers called Unit Load Devices, (ULD's), which are loaded with cargo and luggage before being placed in the aircraft. U.S. patent application Ser. No. 11/121,790 which is still pending and 10/942,336 which is now abandoned, by the same inventor address the issue of explosives within ULD's. Smaller aircraft, such as Boeing 737's or regional jets, have open cargo holds where items are placed directly into the hold. To cause an aircraft to become non-airworthy, an explosive device detonated in an aircraft cargo hold has only to puncture the thin aluminum skin or disrupt the sensitive electronic and hydraulic control lines. Even a small explosive detonated in the cargo hold during flight will likely destroy the aircraft. Therefore it is an object of this invention to provide a system that makes the cargo hold of aircraft highly resistant to explosives. The invention also applies to many other enclosed spaces besides aircraft which may require resistance to explosives, so other benefits of the invention will be described accordingly.

BRIEF SUMMARY OF THE INVENTION

The invention is a liner for an enclosed space, and the liner is constructed of a blast resistant composite material. In the preferred embodiment, the composite material is preferably a polymer resin matrix with a fiber reinforcement. The preferred polymer resin matrix includes, but is not limited to a vinyl ester resin. In one version, the fiber reinforcement is an aramid material. In another version, the fiber reinforcement is S-2®Glass. In another version, the fiber reinforcement is a carbon or graphite fiber.

In one embodiment, the liner is fabricated inside the enclosed space. In one version the liner is constructed as a segmented three piece self-contained pressure vessel with an end cap at each end. In another aspect, the pieces are laid up and cured on a collapsible tool.

In another embodiment the liner is fabricated using the Vacuum Infusion Process. In one version, the pieces are assembled to create a pressure vessel inside the interior space such that in the event of an explosion, dilation of the liner is allowed.

In one version, of the liner, the enclosed space is an aircraft cargo hold. In one aspect of this version, the composite thickness is 6-12 plies (4-8 mm) and the weight is 1.5 to 3.0 pounds per square foot. In one version, a doorway is left in the liner and including an oversized internal door constructed of blast resistant liner material.

In one embodiment, the enclosed space is a room where explosives are stored or processed. In another, the enclosed space is the interior of an existing shipping container. In a further embodiment the enclosed space is a cargo hold on a vehicle or ship.

In another embodiment, the invention is a method of lining a cargo hold with a blast resistant composite material. The method includes first fabricating forward and aft bulkheads (i.e. pressure vessel end caps) in-situ and attaching to the cargo hold floor. The next step is fabricating the hold floor in-situ and attaching to the end caps as well as the cargo hold floor, then fabricating all left hand side cargo hold segments, starting at the forward end cap and proceeding to the aft end cap such that each segment is bolted to a neighboring flange associated with the adjacent segment. The final step is fabricating the right hand side segments, alternating between fore and aft until all segments converge at the main cargo door(s) where doorway cutouts are incorporated, such that an oversized inside door is attached to the cargo hold which becomes self sealing upon pressurization of the cargo hold.

BRIEF DESCRIPTION OF THE DRAWINGS

The invention will be better understood by referring to the following illustrations.

DETAILED DESCRIPTION OF THE INVENTION

The inventor has produced a completely new concept for blast protection, enabled in part by employing very different materials than currently used for aircraft, vehicle or building construction. Conventional materials such as thin aluminum or steel provide little or no blast protection. Conventional materials exhibit relatively low specific strength and/or specific modulus. Consequently, blast resistant containers constructed using conventional materials do not offer a weight efficient solution. A new class of materials enables a different approach. Such materials are similar to fiberglass in that they utilize a reinforcing fiber architecture, which is infused with a polymer resin matrix. The most effective version of composite construction utilizes materials which exhibit high compressive and tensile specific strengths and high compressive and tensile specific moduli. Specific strength is defined as the ultimate compressive (or tensile) strength of the material divided by its density. Specific modulus is the elastic compressive (or tensile) modulus of the material divided by its density. The polymer resin matrix is resistant to galvanic corrosion, solvents and chemical agents. These materials have much higher resistance to blast per unit volume than metals.

Figure 1:
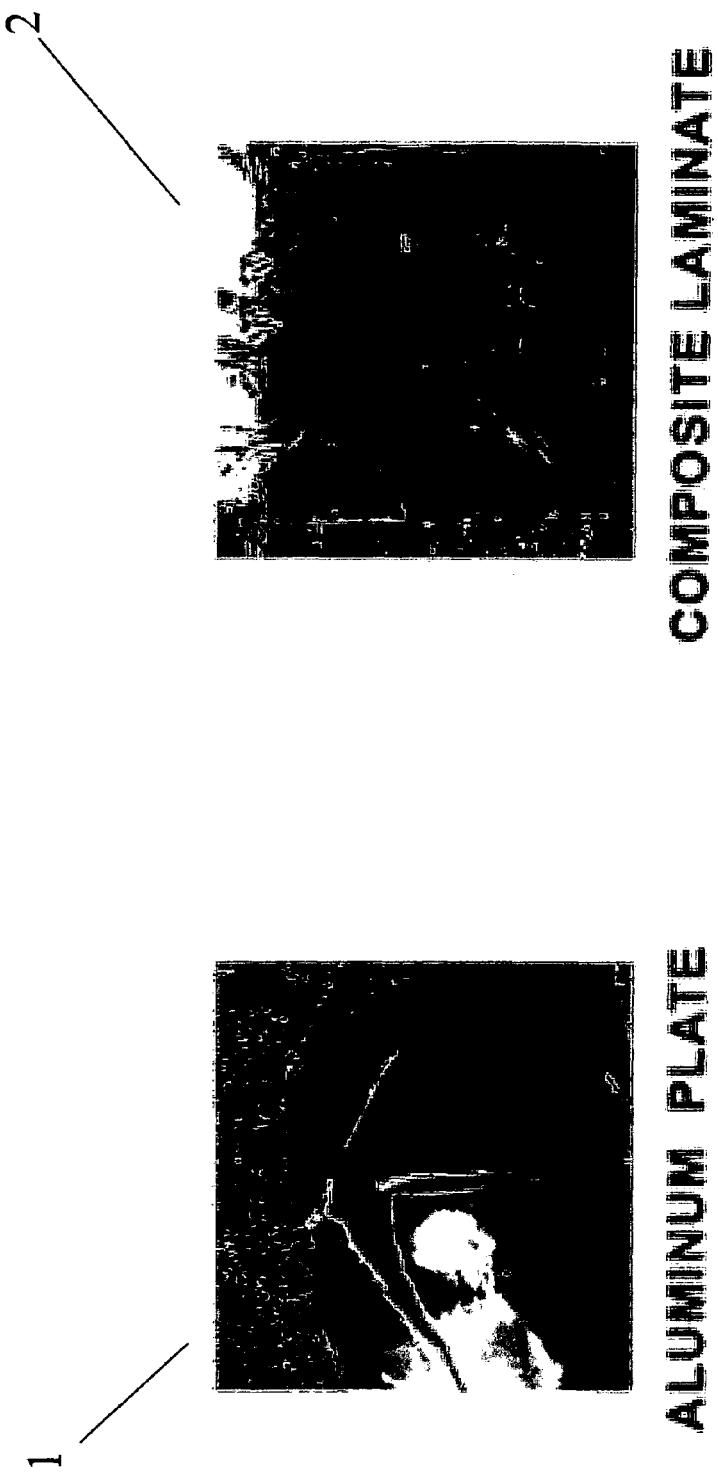
FIG. 1 illustrates the improved blast resistance of the composite material compared to conventional metal materials.

FIG. 1 shows the results of a test of the blast resistant composite compared to aluminum, particularly relevant for aircraft, whose skins are aluminum. As shown in FIG. 1 the aluminum plate 1 ruptures when exposed to blast from 2.7 kg of C-4 at a standoff distance of 152 mm. The composite plate 2 does not rupture when exposed to a blast from 4.6 kg of C-4 at the same distance.

Figure 2:
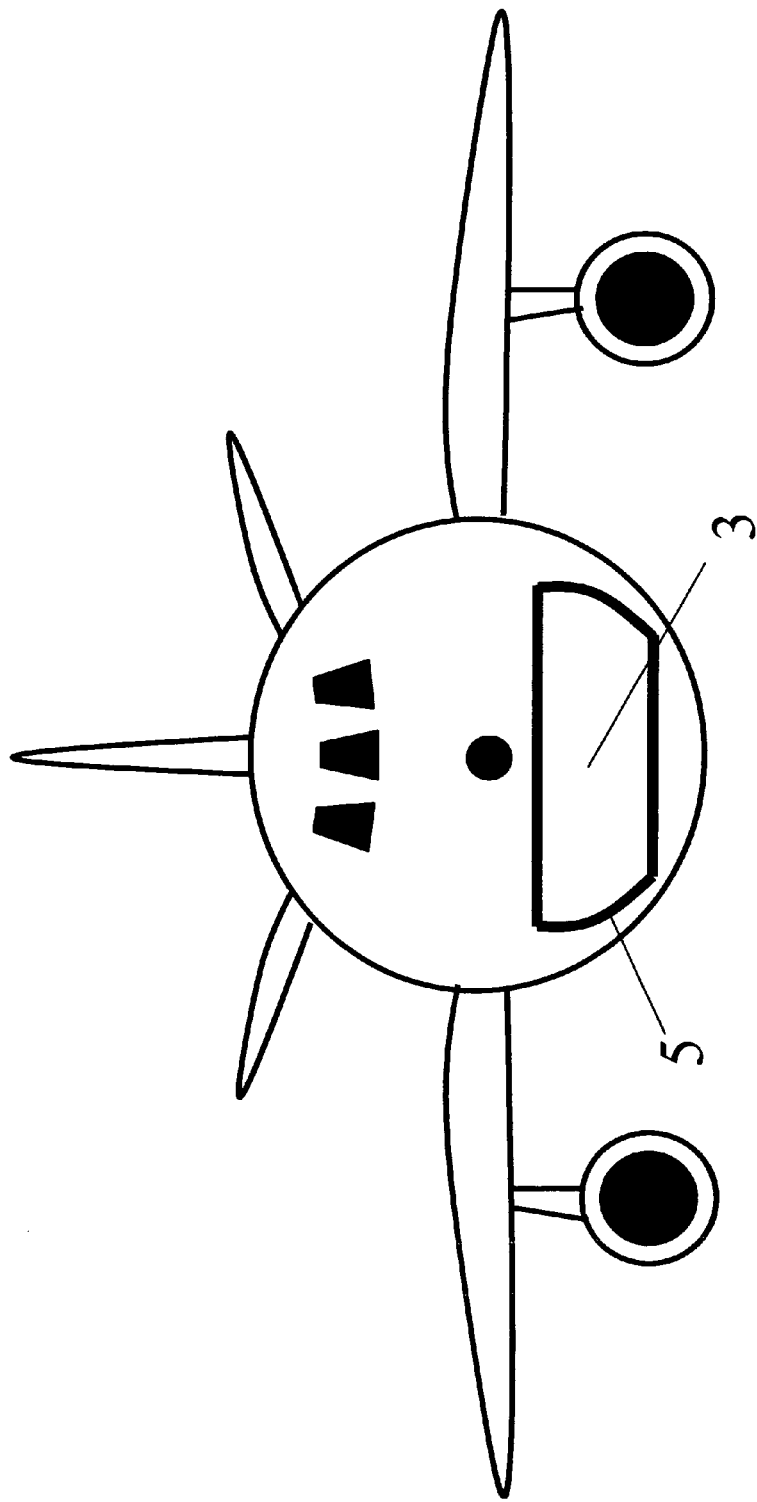
FIG. 2 shows the invention assembled inside the cargo hold of a typical aircraft.
Figure 3:
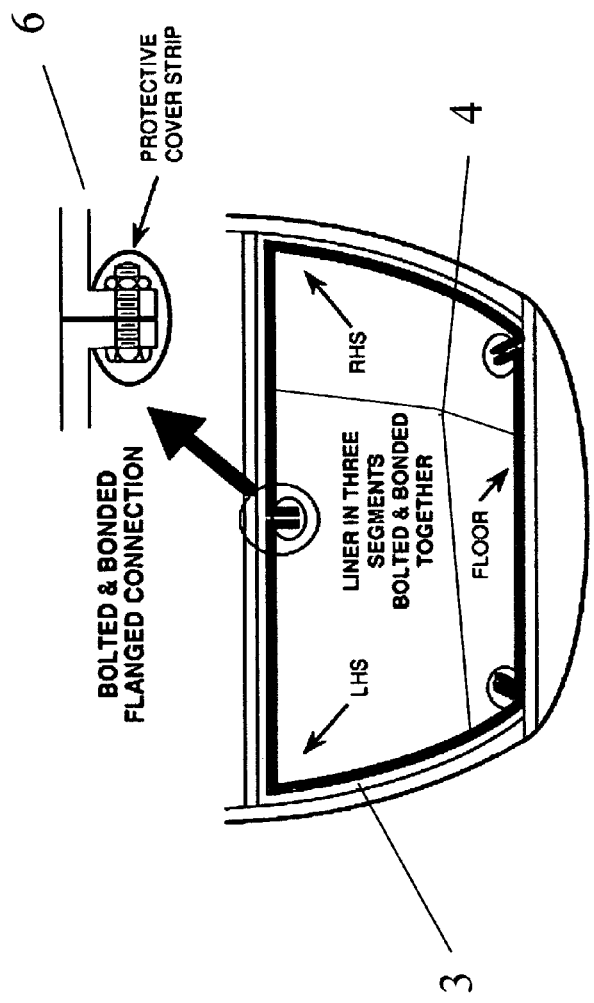
FIG. 3 shows the invention in cross-section installed in a typical aircraft cargo hold.
Figure 4:
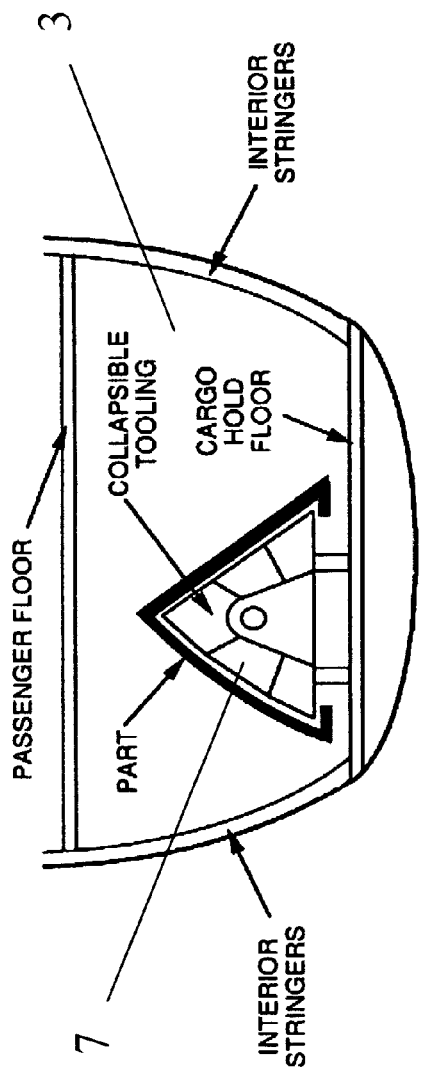
FIG. 4 shows the in-situ fabrication of the invention using a collapsible tool.

In order to simultaneously defeat blast and fragmentation threats at minimum weight, the novel invention is a composite liner 5, shown in FIG. 2 as a Cargo Hold Liner (CHL) installed in a typical aircraft. FIG. 3 shows a cross-section of the aircraft cargo hold 3 and the three segmented pieces 4 of the composite liner installed within the aircraft cargo hold. The segments of the Cargo Hold Liner will be fabricated inside the aircraft's cargo hold 3 by laying up successive plies of 60 inch wide overlapping woven fabric broadgoods to the required wall thickness. The plies will be laid-up and bagged on a collapsible tool surface 7 as shown in FIG. 4 and cured inside the cargo hold 3 using the Vacuum Infusion Process (VIP). This is a closed cell curing process by which the release of volatile organic compounds (VOC's) is negligible and maintained well below EPA exposure limits. After the in-situ curing of parts is completed, cured segments 4 of the composite Cargo Hold Liner 5 are removed from the collapsible tool and assembled inside the aircraft's cargo hold 3 as shown in FIG. 2. After assembly of the segments, the CHL becomes a self contained pressure boundary (i.e. vessel) with its own pressure activated door. The CHL is attached to the floor of the cargo hold whereby dilation of the vessel is permitted during explosive detonation. Such dilation allows the CHL to expand (approx. 12 mm on each side) without contacting the fuselage of the aircraft's cargo hold while simultaneously preventing fragmentation threats from penetrating. Alternatively, soft shell (i.e. blanket type) liners are more compliant (i.e. flexible) and permit excessive deformation which results in greater load transfer to the aircraft fuselage, thereby increasing the risk of impaired air-worthiness.

Three preferred composite laminate solutions are contemplated, each offering slightly different costs and benefits. All composite solutions preferably incorporate, but are not necessarily limited to, a vinyl ester, epoxy or phenolic resin matrix, in conjunction with one of three different types of fiber reinforcements. The composite laminate which utilizes a vinyl ester resin, that is resistant to chemical agents and solvents, is ideally suited as a liner within aircraft cargo holds, where spillage or leakage of unwanted or unanticipated caustic cargo could potentially cause significant damage to the aircraft.

With regard to fiber reinforcement, the novel CHL has three preferred reinforcing fibers, namely, an aramid (i.e. Kevlar) fiber solution, an S-2®Glass fiber solution and a carbon (or graphite) fiber solution. The acquisition cost for the aramid solution is higher but also offers a lighter weight solution relative to the S-2®Glass solution. On the other hand, the aramid solution exhibits a higher repair, maintenance and life cycle cost relative to the S-2®Glass solution by virtue of the significantly reduced compressive strength exhibited by aramid laminates. The carbon (or graphite) fiber solution offers improved space efficiency at slightly reduced blast efficiency relative to aramid or S-2®Glass.

The following wall thicknesses and weights are applicable to the novel CHL design:

Thickness: ranging from 6 to 12 plies of laminate (4 mm to 8 mm) depending on location on the CHL surface; and Weight: ranging from 1.5 to 3.0 pounds per square foot depending on location As previously mentioned, the novel cargo hold liner will be fabricated inside the cargo hold as three cured (i.e. rigid) laminate segments 4 as shown in the cross-sectional view of FIG. 3, using portable collapsible tooling 7 as shown in FIG. 4. After tooling 7 is collapsed to facilitate removal of the part from the tool, as well as removal of the tool through the cargo hold door, the cured parts (i.e. pressure vessel segments) will be assembled inside the aircraft as shown in FIG. 2 and attached to the floor of the cargo hold. The flanges of mating segments 6, FIG. 3, will be mechanically fastened using through bolts which are all accessed from inside the CHL. The attachment of the CHL to the cargo hold floor accommodates dilation of the liner floor such that no loads are transferred to the fuselage in the direction transverse to the aircraft. The order of part fabrication and assembly is described as follows:

1. Forward and aft (CHL) bulkheads (i.e. pressure vessel end caps) will first be fabricated in-situ and attached to the aircraft cargo hold floor.
2. Next the CHL floor will be fabricated in-situ and attached to the end caps as well as the cargo hold floor.
3. Next to be fabricated are all left hand side CHL segments starting at the forward end cap and proceeding to the aft end cap. Each segment is to be bolted to a neighboring flange associated with the adjacent segment.

Finally, the right hand side segments are to be fabricated alternating between fore and aft until all segments converge at the main cargo door(s) where doorway cutouts are to be incorporated. An oversized inside door is attached to the CHL which becomes self sealing upon pressurization of the cargo hold.

Figure 5:
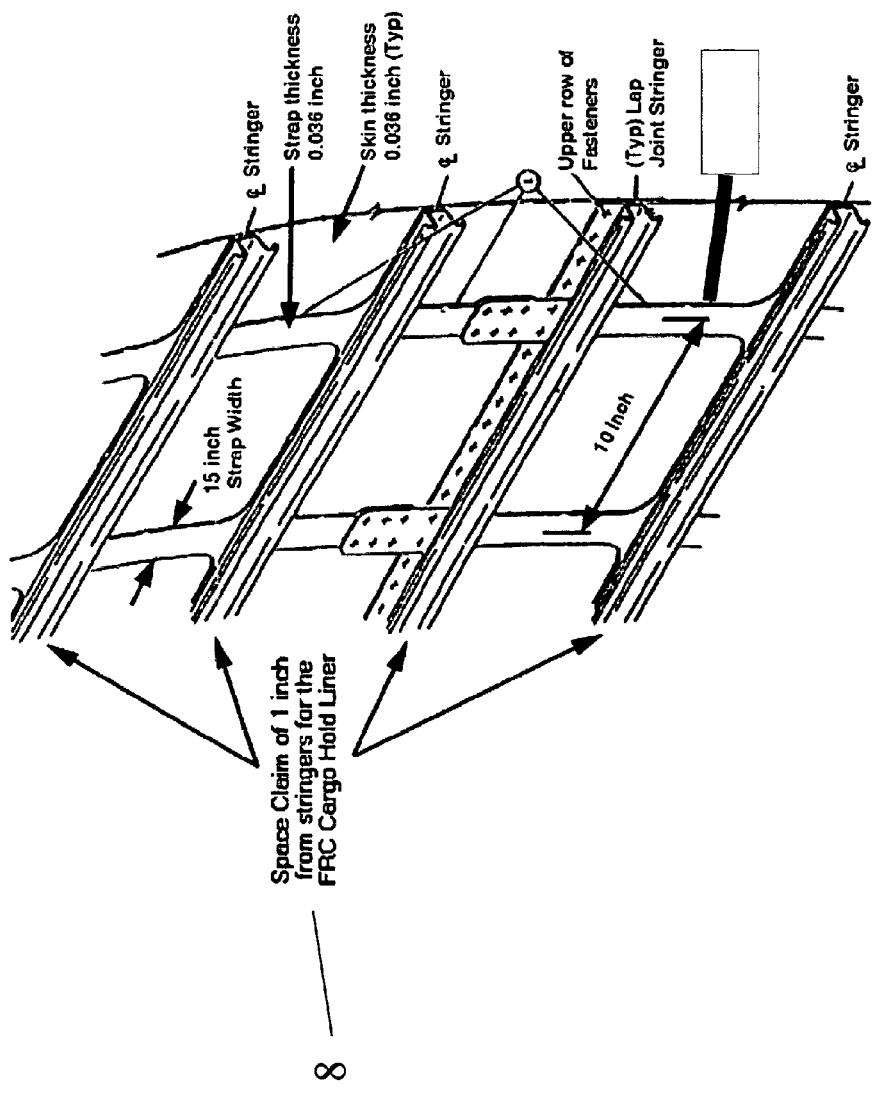
FIG. 5 identifies the space claim of the invention relative to a typical aircraft fuselage.

The novel liner concept for a CHL creates a structure within a structure, i.e. a pressure vessel within the aircraft cargo hold as shown in FIG. 2. Some interior volume will be lost, as shown in FIG. 5, based on the maximum thickness and dilational space claim of 12 mm and 13 mm, respectively (or roughly a 1 inch zone around the top and sides and a half inch zone along the floor) as measured inward from the fuselage stringers as for a Boeing 737 aircraft 8.

The invention is particularly applicable to aircraft cargo holds, as in addition to extremely effective blast protection, the invention can be installed quickly without otherwise affecting the aircraft. Moreover compared to any other proposed blast protection schemes the invention is much lighter. However, the invention applies equally well to many other applications where it is desirable to blast proof the interior of an enclosed space where the enclosure has small doors thereby limiting access to its interior.

Other application examples are

Bomb proofing rooms at police or military installations to either store, or work on, explosives.

Bomb-proofing existing shipping containers.

Bomb proofing cargo spaces on vehicles or ships.

Other uses within the scope of the invention will suggest themselves to those concerned with blast protection.

I claim:

1. A method for adding a blast resistant cargo hold liner to an existing cargo hold, wherein the cargo hold has a door with dimensions smaller than the dimensions of the interior space of the cargo hold, comprising;

bringing into the hold's interior space collapsible tool through the existing door, laying up and curing liner sections on the collapsible tool, wherein the sections are constructed of a blast resistant composite, collapsing and removing the tool from the hold; and, assembling the cured sections into a pressure vessel and attaching the pressure vessel to the interior of the hold.

2. The method of claim 1 wherein the sections include mating flanges, which are mechanically fastened using through bolts which are all accessed from inside the pressure vessel.

3. The method of claim 1 wherein the sections include at least three liner segments and at least two liner endcaps.

4. The method of claim 1 wherein the composite comprises a resin matrix with a fiber reinforcement.

5. The method of claim 4 wherein the fiber reinforcement is an aramid material.

6. The method of claim 4 wherein the fiber reinforcement is S-2 glass.

7. The method of claim 4 wherein the fiber reinforcement is a graphite or carbon fiber.

8. The method of claim 1 wherein the laying up and curing is accomplished with a Vacuum Infusion Process.

9. The method of claim 1 wherein the sections are assembled into a pressure vessel within the interior space such that in the event of an explosion, dilation of the liner is allowed.

* * * * *